(12) United States Patent
Corma Canós et al.

(10) Patent No.: US 7,014,836 B2
(45) Date of Patent: Mar. 21, 2006

(54) SYNTHESIS OF ITQ-17 IN THE ABSENCE OF FLUORIDE IONS

(75) Inventors: Avelino Corma Canós, Valencia (ES); Fernando Rey García, Valencia (ES); María Teresa Navarro Villalba, Valencia (ES); Susana Valencia Valencia, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 105 days.

(21) Appl. No.: 10/750,329

(22) Filed: Dec. 31, 2003

(65) Prior Publication Data

US 2004/0171477 A1 Sep. 2, 2004

Related U.S. Application Data

(63) Continuation of application No. PCT/ES02/00330, filed on Jul. 3, 2002.

(30) Foreign Application Priority Data

Jul. 3, 2001 (ES) ................. 200101608

(51) Int. Cl.
*C01B 39/48* (2006.01)
(52) U.S. Cl. .......... 423/706; 423/708; 423/718; 423/DIG. 27
(58) Field of Classification Search ........ 423/706, 423/708, 718, DIG. 27
See application file for complete search history.

(56) References Cited

U.S. PATENT DOCUMENTS 3,459,676 A 8/1969 Kerr 3,692,470 A 9/1972 Ciric (Continued)

OTHER PUBLICATIONS

Corma, A.; Synthesis of pure polimorph C of beta zeolite in a fluoride free system; Chem. Commun. (Cambridge, U.K.) 2001, vol. 16, pp. 1486-1487; Oct. 8, 2001.

(Continued)

*Primary Examiner*—David Sample

(57) ABSTRACT

The present invention refers to a crystalline material that does not contain fluorides, with a composition in a roasted state corresponding to that of the material called ITQ-17 and that has a composition on an anhydrous base and in terms of oxide moles upon being synthesized, unroasted, represented by:

$$xX_2O_3:(1-z)YO_2:zGeO_2:r/nR_nO$$

Figure 1:
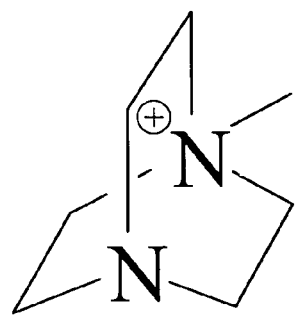
Figure 1:
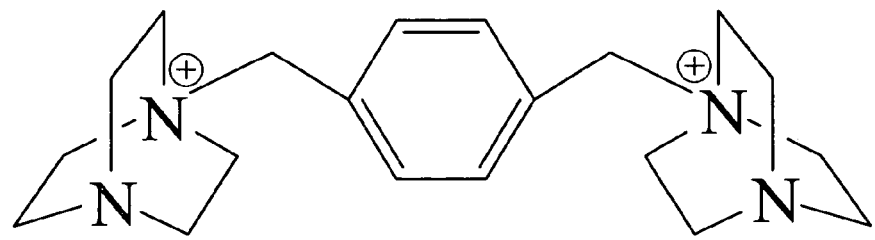

wherein:
X is at least one trivalent element,
Y is one or more tetravalent elements other than germanium,
R is an organic structure directing compound, preferably the cation 1-methyl-4-aza,1-azoniumbicyclo[2.2.2]octane (DABMe$^+$) or the cation 1,4-bis[N-(4-aza,1-azoniumbicyclo[2.2.2]octane)methyl]benzene (d-DABBz)$^{+2}$
x varies between 0 and 0.02,
z is comprised between 0.02 and 0.67,
r varies between 0.01 and 0.5, and
n is 1 or 2.

It also refers to a process for synthesizing said material, as well as to the material obtained by said process and subjected to a step of post-synthesis to eliminate the organic component from its structure.

34 Claims, 1 Drawing Sheet

1 - methyl - 4 - Aza, 1 - azoniumbicyclo [2.2.2] octane (DABMe $^+$)

1,4 - bis [ N- (4 - aza, 1 - azoniumbicyclo [2,2,2] octane) methyl benccne ] ( d-DABBz )$^{2+}$

U.S. PATENT DOCUMENTS

| | | | |
|---|---|---|---|
| 4,582,693 A * | 4/1986 | Desmond et al. | 423/706 |
| 6,652,831 B1 * | 11/2003 | Villaescusa Alonso et al. | 423/706 |
| 6,787,124 B1 * | 9/2004 | Chester et al. | 423/718 |
| 6,896,869 B1 * | 5/2005 | Corma Canos et al. | 423/718 |
| 2004/0089587 A1 * | 5/2004 | Canos et al. | 208/111.01 |

OTHER PUBLICATIONS

Takewaki, T. et al.; Zeolite synthesis using 1,4-diazabiciclo [2.2.2] octane (DABCO) derivatives as structure-directing agents; Microporous and mesoporous materials, 1999, vol. 33, pp. 197-207.

* cited by examiner

1 - methyl - 4 - Aza, 1 - azoniumbicyclo [ 2 .2 . 2 ] octan$_e$ (DABMe$^+$)

1,4 - bis [ N- (4 - aza, 1 - azoniumbicyclo [ 2 , 2 , 2 ] octan$_e$)
methyl bencene ] ( d-DABBz )$^{2+}$

SYNTHESIS OF ITQ-17 IN THE ABSENCE OF FLUORIDE IONS

RELATED APPLICATIONS

The present application is a Continuation of co-pending PCT Application No. PCT/ES02/00330, filed Jul. 3, 2002, which in turn, claims priority from Spanish Application Serial No. 200101608, filed Jul. 3, 2001. Applicants claim the benefits of 35 U.S.C. §120 as to the PCT application and priority under 35 U.S.C. §119 as to said Spanish application, and the entire disclosures of both applications are incorporated herein by reference in their entireties.

TECHNICAL FIELD

The present invention refers to a novel microporous crystalline material which in a roasted state has a composition equivalent to ITQ-17, and that is synthesized in the absence of fluoride ions.

BACKGROUND

Zeolites are microporous crystalline aluminosilicates that have found important uses as catalysts, adsorbents and ionic exchangers. Many of these zeolitic materials have well defined structures that form channels and cavities inside themselves which because of having a uniform size and shape permit adsorption of certain molecules, whereas they prevent other molecules—which are too large to diffuse through the pores—from passing inside the crystal. This property gives these materials molecular sieve properties. These molecular sieves can include in the lattice Si and other elements of group IIIA of the periodic system, all of them tetrahedrally coordinated, the tetrahedrons being attached by their vertexes by means of oxygen atoms of the lattice. The negative charge produced by the elements of group IIIA tetrahedrally coordinated in lattice positions is compensated by the presence in the crystal of cations such as for example alkali or alkaline earth metals. A type of cation may be totally or partially exchanged by another type of cation by ionic exchange techniques. By means of cationic exchange it is possible to vary the properties of a given silicate by selecting the desired cation.

Many zeolites have been synthesized in the presence of an organic molecule that acts as a structure directing agent. Very frequently these organic molecules that act as structure directing agents (SDA) contain nitrogen in their composition that can give rise to stable organic cations in the reaction medium.

Mobilization of silica may be carried out in the presence of OH$^-$ groups and a basic medium that may be introduced by the SDA itself, such as for example, tetrapropylammonium hydroxide in the case of zeolite ZSM-5. It is also known that fluoride ions can also mobilize silica for the synthesis of zeolites, and the use of HF in H$_2$O at a low pH as a mobilizing agent of silica for the synthesis of ZSM-5 has been described, for example, in European patent EP-337479.

In the same way zeolite ITQ-17 has been synthesized in a conventional manner in the synthesis of zeolites, as described in patent application PCT/ES01/00385, by means of a process that comprises the use of fluorides.

However, the use of fluoride ions in synthesis is less desired from an industrial point of view than the use of OH$^-$, given that the presence of fluoride ions requires the use of special materials in the synthesis equipment, as well as a specific treatment of the waste water and gases.

DESCRIPTION OF THE INVENTION

The present invention refers to a crystalline material characterized in that it does not contain fluorides, with a composition in a roasted state corresponding to that of the material called ITQ-17 and in that it has a composition on an anhydrous base and in terms of oxide moles upon being synthesized, unroasted, represented by:

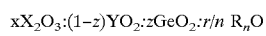

wherein:
 X is at least one trivalent element,
 Y is one or more tetravalent elements other than germanium,
 R is an organic structure directing compound,
 x varies between 0 and 0.02, preferably between 0 and 0.01,
 z is comprised between 0.02 and 0.67, preferably between 0.04 and 0.5,
 r varies between 0.01 and 0.5, preferably between 0.01 and 0.25, and
 n is 1 or 2, and whose most representative values of the X-ray diffraction angle are the following:

| 2Θ ± 0.5 (degrees) | Intensity (I/I$_o$) |
|---|---|
| 6.89 | w, m |
| 9.57 | vs |
| 19.35 | m |
| 21.37 | m |
| 21.90 | vs | wherein (I/I$_o$) represents relative intensities, I$_o$ being the intensity of the most intense peak to which a value of 100 has been assigned. The relative intensities have been expressed in the following terms: w=weak intensity (between 0 and 20%); m=medium intensity (between 20 and 40%); s=strong intensity (between 40 and 60%) and vs=very strong intensity (between 60 and 100%).

From the values given for the coefficients of the formula it is inferred that this material may be obtained in the absence of added trivalent elements.

In a particular embodiment "X" is at least one element selected among Al, B, Fe, In, Ga and Cr.

In a preferred embodiment of the present invention "Y" may be Si, V, Sn or Ti, and more preferably "Y" is silicon.

In a preferred embodiment of the present invention R is preferably the cation 1-methyl-4-aza,1-azoniumbicyclo [2.2.2]octane (DABMe$^+$) or the cation 1,4-bis[N-(4-aza,1-azoniumbicyclo[2,2,2]octane)methyl]benzene (d-DABBz)$^{2+}$, both shown in FIG. 1.

In a preferred embodiment of the present invention the crystalline material has a composition on an anhydrous base and in terms of oxide moles upon being synthesized, unroasted, represented by:

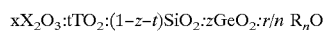

wherein:
 T is one or more tetravalent elements other than Ge or Si,
 t varies between 0 and 0.15, preferably between 0 and 0.10,
 z is comprised between 0.02 and 0.67, preferably between 0.04 and 0.5, and "x", "X", "R", "r" and "n" have the meaning given above, and wherein:

R is preferably the cation 1-methyl-4-aza,1-azoniumbicyclo[2.2.2]octane (DABMe$^+$) or the cation 1,4-bis[N-(4-aza,1-azoniumbicyclo[2.2.2]octane) methyl]benzene (d-DABBz)$^{2+}$, X is preferably one or more elements of the group formed by B, Al, In, Ga, Fe and Cr and T is preferably one or more tetravalent elements selected between V, Sn and Ti.

Other bands or peaks that are found in the X-ray diffraction diagram of the crystalline material of the present invention are the ones shown in Table I hereinafter:

TABLE I

List of diffraction peaks of a characteristic sample of the crystalline material of the present invention synthesized in a basic medium and in a total absence of fluoride anions and containing DABMe$^+$ in its pores.

| 2Θ ± 0.5 (degrees) | Intensity (I/I$_o$) |
|---|---|
| 13.38 | w |
| 13.77 | w |
| 15.10 | w |
| 15.40 | w |
| 16.61 | w |
| 16.83 | w |
| 19.61 | w |
| 20.52 | w |
| 20.80 | w |
| 22.97 | w |
| 23.87 | w |
| 24.88 | w |
| 25.51 | w |
| 25.84 | w |
| 27.06 | w |
| 27.83 | m |
| 28.55 | w |
| 29.17 | w |
| 29.57 | w |
| 30.49 | w |
| 31.31 | w |
| 31.99 | w |
| 32.44 | w |
| 32.67 | w |
| 33.68 | w |
| 34.41 | w |
| 34.75 | w |
| 35.16 | w |
| 35.77 | w |
| 37.64 | w |
| 38.48 | w |
| 39.28 | w |

The diffraction patterns were obtained in a Philips PW 1830 diffractometer with a PW 1710 controller and using Kα radiation of Cu. The diffractogram has been obtained by the powder method and using a variable divergence slit.

The crystalline material of the present invention, once roasted, has a composition that corresponds to that of the material called ITQ-17 and has as most important lines in its diffraction diagram:

| 2Θ ± 0.5 (degrees) | Intensity (I/Io) |
|---|---|
| 6.89 | vs |
| 9.59 | vs |
| 21.27 | m |
| 21.87 | vs |
| 27.87 | m |

In particular, the pairs of 2Θ values represented in Table I correspond to the diffraction pattern of materials whose lattice is exclusively comprised of silicon oxide, germanium and organic matter, with a Si/Ge ratio=2.5 and synthesized using 1-methyl-4-aza,1-azoniumbicyclo[2,2,2]octane hydroxide (DABMeOH) as the structure directing agent.

Table II shows the diffraction peaks of a characteristic sample of ITQ-17 synthesized in a basic medium and in the total absence of fluoride anions and in its roasted form

TABLE II

| 2Θ ± 0.5 (degrees) | Intensity (I/Io) |
|---|---|
| 6.89 | vs |
| 9.59 | vs |
| 11.36 | w |
| 13.32 | w |
| 13.81 | w |
| 15.03 | w |
| 15.40 | w |
| 16.85 | w |
| 19.29 | w |
| 19.62 | w |
| 20.48 | w |
| 20.79 | w |
| 21.27 | m |
| 21.87 | vs |
| 22.96 | w |
| 23.82 | w |
| 24.44 | w |
| 24.80 | w |
| 25.76 | w |
| 26.82 | w |
| 27.87 | m |
| 28.51 | w |
| 29.07 | w |
| 29.57 | w |
| 30.29 | w |
| 30.40 | w |
| 31.15 | w |
| 31.93 | w |
| 32.59 | w |
| 33.44 | w |
| 34.48 | w |
| 34.97 | w |
| 35.70 | w |
| 37.36 | w |
| 39.08 | w |

The sample of the roasted zeolite ITQ-17 whose diffraction values are given in Table II have a Si/Ge ratio molar=5 and was synthesized using 1-methyl-4-aza,1-azoniumbicyclo[2,2,2]octane hydroxide (DABMeOH) as the structure directing agent.

The variation in the measurements of the 2Θ angle due to the instrumental error is estimated at ±0.5 degrees.

It should be taken into account that the listed diffraction data for these samples as simple or single lines may really be due to the overlapping of different diffraction peaks that in certain conditions, such as differences due to small crystallographic changes, may appear as distinguishable or partially distinguishable lines. Normally these crystallographic changes may include minor changes in the parameters of the unit cell and/or changes in the symmetry of the crystal, without there being a change in the structure. These minor changes, that include changes in relative intensities may also be due to differences in the type and amount of compensation cations, lattice composition, crystal size and shape thereof, preferential orientations or to the type of thermal or hydrothermal treatments endured by the material.

In a preferred embodiment of the present invention, wherein R is the cation 1-methyl-4-aza,1-azoniumbicyclo[2.2.2]octane DABMe$^+$), the crystalline material may be represented by the formula

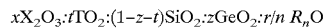

wherein the parameters have the values indicated above in this specification and has the following composition expressed as molar ratios:

ROH/(SiO$_2$+GeO$_2$+TO$_2$) is between 0.5 and 0.01, preferably between 0.25 and 0.01, GeO$_2$/(SiO$_2$+GeO$_2$+TO$_2$) is between 0.67 and 0.02, preferably between 0.5 and 0.04, (SiO$_2$+GeO$_2$+TO$_2$)/X$_2$O$_3$ is between ∞ and 50, preferably between ∞ and 100, TO$_2$/(SiO$_2$+GeO$_2$+TO$_2$) is between 0.15 and 0, preferably between 0.1 and 0.

In an additional preferred embodiment of the present invention wherein R is the cation 1,4-bis[N-(4-aza,1-azoniumbicyclo[2,2,2]octane)methyl]benzene (d-DABBZ)$^2$+, the crystalline material may be represented by the formula:

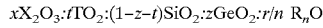

$xX_2O_3{:}tTO_2{:}(1-z-t)SiO_2{:}zGeO_2{:}r/n\ R_nO$ wherein the parameters have the values indicated above in this specification and has the following composition expressed as molar ratios:

R(OH)$_2$/(SiO$_2$+GeO$_2$+TO$_2$): between 0.25 and 0.005, preferably between 0.125 and 0.005, GeO$_2$/(SiO$_2$+GeO$_2$+TO$_2$): between 0.67 and 0.02, preferably between 0.5 and 0.04, (SiO$_2$+GeO$_2$+TO$_2$)/X$_2$O$_3$: between and ∞ 50, preferably between ∞ and 100, and TO$_2$/(SiO$_2$+GeO$_2$+TO$_2$): between 0.15 and 0, preferably between 0.1 and 0.

Another object of the present invention is a process for synthesizing a crystalline material that does not contain fluorides, with a composition in a roasted state corresponding to the one of the material called ITQ-17, and that have a composition on an anhydrous base and in terms of oxide moles upon being synthesized, unroasted, represented by:

$xX_2O_3{:}(1-z)YO_2{:}zGeO_2{:}r/n\ R_nO$ wherein:

X is at least one trivalent element,

Y is one or more tetravalent elements other than germanium,

R is at least one organic structure directing compound, x varies between 0 and 0.02, preferably between 0 and 0.01, z is comprised between 0.02 and 0.67, preferably between 0.04 and 0.5, r varies between 0.01 and 0.5, preferably between 0.01 and 0.25, and n is 1 or 2, and whose most representative values of the X-ray diffraction angle are the following:

| 2Θ ± 0.5 (degrees) | Intensity (I/I$_o$) |
|---|---|
| 6.89 | w, m |
| 9.57 | vs |
| 19.35 | m |
| 21.37 | m |
| 21.90 | vs | wherein w=weak intensity (between 0 and 20%); m=medium intensity (between 20 and 40%); s=strong intensity (between 40 and 60%) and vs=very strong intensity (between 60 and 100%), and whose process comprises:

a) preparing a synthesis mixture that comprises at least:
a source of one or several tetravalent elements included under the name Y,
a source of Ge,
a source of at least one structure directing agent, and
water;

b) keeping the synthesis mixture at temperatures between 100 and 200° C., until the crystalline material is formed and c) recovering the crystalline material.

In a preferred embodiment of the present invention the source of germanium and of the rest of the tetravalent elements is an oxide.

Besides, according to the process for preparing the crystalline material the synthesis mixture may also comprise a source of one or more trivalent elements, X, a source of one or more tetravalent elements other than Si and Ge; or a mixture of trivalent and tetravalent elements.

In a preferred embodiment of the process of the present invention the source of the structure directing agent, R, is 1-methyl-4-aza,1-azoniumbicyclo[2,2,2]octane hydroxide (DABMeOH), and the synthesis mixture has a composition expressed in terms of molar ratios in the following intervals:

H$_2$O/(YO$_2$+GeO$_2$): between 100 and 0.01, preferably between 50 and 0.1,

OH$^-$/(YO$_2$+GeO$_2$): between 3 and 0.01, preferably between 1 and 0.03,

R/(YO$_2$+GeO$_2$): between 3 and 0.01, preferably between 1 and 0.03,

GeO$_2$/(YO$_2$+GeO$_2$): between 0.67 and 0.02, preferably between 0.5 and 0.04, and (YO$_2$+GeO$_2$)/X$_2$O$_3$: between ∞ and 50, preferably between ∞ and 100.

In a preferred embodiment of the process of the present invention the source of the structure directing agent, R, is 1,4-bis[N-(4-aza,1-azoniumbicyclo[2,2,2]octane)methyl] benzene hydroxide (d-DABBz(OH)$_2$), and the synthesis mixture has a composition expressed in terms of molar ratios in the following intervals:

H$_2$O/(YO$_2$+GeO$_2$): between 100 and 0.01, preferably between 50 and 0.1,

OH$^-$(YO$_2$+GeO$_2$): between 3 and 0.1, preferably between 1 and 0.03,

R/(YO$_2$+GeO$_2$): between 1.5 and 0.005, preferably between 0.5 and 0.015,

GeO$_2$/(YO$_2$+GeO$_2$): between 0.67 and 0.02, preferably between 0.5 and 0.04, and (YO$_2$+GeO$_2$)/X$_2$O$_3$: between ∞ and 50, preferably between ∞ and 100.

In an additional preferred embodiment of the process of the present invention, a material may be prepared, whose composition may be represented by the formula:

$xX_2O_3{:}tTO_2{:}(1-z-t)SiO_2{:}zGeO_2{:}r/n\ R_nO$ wherein

T is one or more tetravalent elements other than Ge or Si, t varies between 0 and 0.15, preferably between 0 and 0.10, z is comprised between 0.02 and 0.67, preferably between 0.04 and 0.5 and "x", "X", "R", "r" and "n" have the meaning given above, and said process comprises:

a) preparing a synthesis mixture that comprises at least:
a source of silicon,
a source of Ge, and
a source of at least one structure directing agent (R) and water b) keeping the synthesis mixture at temperatures between 100 and 200° C., until the crystalline material is formed and c) recovering the crystalline material.

An even more preferred additional embodiment of the process of the present invention comprises:

a) preparing a synthesis mixture that comprises at least:
a source of silicon,
a source of Ge, and
a source of at least one structure directing agent (R), and water b) keeping the synthesis mixture at temperatures between 100 and 200° C., until the crystalline material is formed and c) recovering the crystalline material. the source of the structure directing agent, R, is 1-methyl-4-aza,1-azoniumbicyclo[2,2,2]octane hydroxide (DABMeOH), and the synthesis mixture has a composition expressed in terms of molar ratios in the following intervals:

$H_2O/(SiO_2+GeO_2+TO_2)$: between 100 and 0.01, preferably between 50 and 0.1, $OH^-/(SiO_2+GeO_2+TO_2)$: between 3 and 0.01, preferably between 1 and 0.3, $R/(SiO_2+GeO_2+TO_2)$: between 3 and 0.01, preferably between 1 and 0.03, $GeO_2/(SiO_2+GeO_2+TO_2)$: between 0.67 and 0.02, preferably between 0.5 and 0.04, $(SiO_2+GeO_2+TO_2)/X_2O_3$: between $\infty$ and 50, preferably between $\infty$ and 100, and $TO_2/(SiO_2+GeO_2+TO_2)$: between 0.15 and 0, preferably between 0.1 and 0. Besides, the synthesis mixture can comprise one or more tetravalent elements, T, selected among V, Sn and Ti. Preferably the source of germanium, silicon and of the rest of the tetravalent elements is an oxide. The synthesis mixture can also include a source of one or more trivalent elements, X.

A preferred additional embodiment of the process of the present invention comprises:

a) preparing a synthesis mixture that comprises at least:
a source of silicon,
a source of Ge, and
a source of at least one structure directing agent (R), and water b) keeping the synthesis mixture at temperatures between 100 and 200° C., until the crystalline material is formed and c) recovering the crystalline material the source of the structure directing agent (R) is 1,4-bis[N-(4-aza,1-azoniumbicyclo[2,2,2]octane)methyl]benzene hydroxide (d-DABBz (OH)$_2$), and the synthesis mixture has a composition expressed in terms of molar ratios in the following intervals:

$H_2O/(SiO_2+GeO_2+TO_2)$: between 100 and 0.01, preferably between 50 and 0.1

$OH^-/(SiO_2+GeO_2+TO_2)$: between 3 and 0.01, preferably between 1 and 0.03

$R/(SiO_2+GeO_2+TO_2)$: between 1.5 and 0.005, preferably between 0.5 and 0.015

$GeO_2/(SiO_2+GeO_2+TO_2)$: between 0.67 and 0.02, preferably between 0.5 and 0.04, $(SiO_2+GeO_2+TO_2)/X_2O_3$: between $\infty$ and 50, preferably between $\infty$ and 100, $TO_2/(SiO_2+GeO_2+TO_2)$ between 0.15 and 0, preferably between 0.1 and 0. The synthesis mixture may also comprise one or more tetravalent elements, T, selected among V, Sn and Ti. Preferably the source of germanium, silicon and of the rest of the tetravalent elements is an oxide. The synthesis mixture can also comprise a source of one or more trivalent elements, X.

Besides, the process of the present invention may also comprise a step of post-synthesis treatment of the material, whereby the organic component is removed from the structure by means of a technique selected among extraction, roasting and both. The material resulting from the cited post-synthesis treatment has a composition that corresponds to ITQ-17 and whose main diffraction lines are the ones given above.

Therefore, according to the process of the present invention, ITQ-17 is prepared in the absence of fluoride ions, with the advantages that this involves from the point of view of industrial equipment and from the economic point of view.

The organic structure directing agent DABMeOH may be easily prepared by methylation of 1,4-diazabicyclo[2.2.2]octane (DABCO) with methyl iodide, followed by exchange of the iodide anion by a hydroxide anion using an exchange resin.

The organic agent d-DABBz(OH)$_2$ may be easily prepared by reacting α,α'-dichloro-p-xylene with 1,4-diazabicyclo[2.2.2]octane (DABCO), followed by exchange of the chloride anions by hydroxide anions using an exchange resin.

The process of the present invention may be carried out statically or with stirring, in autoclaves at a temperature between 100° C. and 200° C., for time periods long enough to achieve crystallization, for example between 24 hours and 30 days. When the crystallization period ends, the crystals are separated from the crystalline material of the mother liquors and they are recovered. It should be taken into account that the components of the synthesis mixture can come from different sources and depending on these sources the time periods and conditions of crystallization may vary.

For the purpose of facilitating synthesis, crystallization seeds may be added to the synthesis medium in amounts up to 10% by weight of the synthesis mixture.

EXAMPLES

Example 1

Preparation of
1-methyl-4-aza,1-azoniumbicyclo[2,2,2]octane
hydroxide (DABMeOH)

A solution of 11.1 g of methyl iodide in 45 g of tetrahydrofuran (THF) is added drop by drop, and by means of an addition funnel, to a solution of 16.8 g of 1,4-diazabicyclo[2.2.2]octane in 250 g of THF. The mixture is allowed to react for 24 hours at room temperature. The solid formed is repeatedly washed with ethyl ether and left to dry. 19.2 g of 1-methyl-4-aza,1-azoniumbicyclo[2.2.2]iodide (DABMeI) are obtained.

Finally, the 19.2 g of DABMeI, previously dissolved in 100 g of water are contacted with 75.7 g of a strongly basic ionic exchange resin (OH) for 24 hours at room temperature and with stirring. In this way finally 110 g of a solution of 1-methyl-4-aza,1-azoniumbicyclo[2,2,2]octane hydroxide (DABMeOH) are obtained.

Example 2

Preparation of 1,4-bis[N-(4-aza,1-azoniumbicyclo[2,2,2]octane)methyl]benzene hydroxide (d-DABBz (OH)$_2$)

A solution of 8.66 g of α,α'-dichloro-p-xylene in 45 g of chloroform (CH$_3$Cl) is added drop by drop and by means of an addition funnel to a solution of 12.09 g of 1,4-diazabicyclo[2.2.2]octane in 250 g of CH$_3$Cl. The mixture is allowed to react for 24 hours at room temperature. The solid formed is washed first with ethyl acetate and then with ethyl ether and left to dry. 19.42 g of 1,4-bis[N-(4-aza,1-azoniumbicyclo[2,2,2]methyl]benzene (d-DABBzCl2) are obtained. Finally, the 19.42 g of d-DABBzCl$_2$, previously dissolved in 100 g of water, are contacted with 90 g of a strongly basic ionic exchange resin (OH) for 24 hours at room temperature and with stirring. In this way, finally 102 g 1,4-bis[N-(4-aza,1-azoniumbicyclo[2,2,2]octane)methyl] benzene hydroxide (d-DABBz(OH)2) are obtained.

Example 3

6.937 g of tetraethylorthosilicate are hydrolyzed in 59.5 g of an aqueous solution of 1-methyl-4-aza,1-azoniumbicyclo [2,2,2]octane hydroxide (DABMeOH) ($0.42 \cdot 10^{-3}$ moles of DABMe(OH)/g). Then 1.743 g of GeO$_2$ are added. The mixture is stirred and the ethanol formed in the hydrolysis of the TEOS evaporates and 51.1 g of water. The resulting mixture is heated at 150° C. in autoclaves coated inside with PTFE. After 12 days of heating the mixture is filtered and 26 g of crystalline material per 100 g of synthesis gel are obtained. The X-ray diffraction pattern of the synthesized crystalline material coincides with the one given in Table I.

Example 4

8.679 g of tetraethylorthosilicate are hydrolyzed in 34.72 g of an aqueous solution of 1-methyl-4-aza,1-azoniumbicyclo[2,2,2]octane hydroxide (DABMeOH) ($0.72 \cdot 10^{-3}$ moles of DABMe(OH)/g). Then 0.871 g of GeO$_2$ are added. The mixture is stirred and the ethanol formed in the hydrolysis of the TEOS evaporates and 26.0 g of water. Finally 0.075 g of zeolite ITQ-17 (Si/Ge=2.5) as a seed are added. The resulting mixture is heated at 150° C. in autoclaves coated inside with PTFE.

After 6 days of heating the mixture is filtered and the product obtained is dried at 100° C. for 12 hours. The final solid is roasted at 540° C. for 3 hours to eliminate the organic matter.

The X-ray diffraction pattern of the synthesized crystalline material coincides with the one given in Table II.

Example 5

8.679 g of tetraethylorthosilicate are hydrolyzed in 21.43 g of an aqueous solution of 1,4-bis[N-(4-aza,1-azoniumbicyclo[2,2,2]octane)methyl]benzene hydroxide (d-DABBz (OH)$_2$) ($0.35 \cdot 10^{-3}$ moles of DABBZ(OH)$_2$/g). Then 0.871 g of GeO$_2$ are added. The mixture is stirred and the ethanol formed in the hydrolysis of the TEOS evaporates and 13.4 g of water. Finally 0.09 g of zeolite ITQ-17 (Si/Ge=5) as a seed are added. The resulting mixture is heated at 150° C. in autoclaves coated inside with PTFE.

After 14 days of heating the mixture is filtered and 35 g of solid per 100 g of synthesis gel are obtained.

The final solid is roasted at 540° C. for 3 hours to eliminate the organic matter.

The X-ray diffraction pattern of the synthesized crystalline material coincides with the one given in Table II.

The invention claimed is:

1. A crystalline material characterized in that it does not contain fluorides, with a composition in a roasted state corresponding to that of the material called ITQ-17 and in that it has a composition on an anhydrous base and in terms of moles of oxides upon being synthesized, unroasted, represented by: $xX_2O_3:(1-z)YO_2:zGeO_2:r/n\ R_nO$ wherein:
X is at least one trivalent element,
Y is one or more tetravalent elements other than germanium,
R is an organic structure directing compound,
x varies between 0 and 0.02,
z is comprised between 0.02 and 0.67,
r varies between 0.01 and 0.5, and
n is 1 or 2,
and whose most representative values of the X-ray diffraction angle are the following:

| 2Θ ± 0.5 (degrees) | Intensity (I/Io) |
|---|---|
| 6.89 | w, m |
| 9.57 | vs |
| 19.35 | m |
| 21.37 | m |
| 21.90 | vs | vs: very strong,
m: medium,
w: weak.

2. A crystalline material according to claim 1, whose composition on an anhydrous base and in terms of moles of oxide upon being synthesized, unroasted, may be represented by:

$$xX_2O_3:tTO_2:(1-z-t)SiO_2:zGeO_2:r/nR_nO$$

wherein:
T is one or more tetravalent elements other than Ge or Si,
t varies between 0 and 0.15, and
z is comprised between 0.02 and 0.67.

3. A crystalline material according to claim 1 or 2, wherein R is the cation 1-methyl-4-aza,1-azoniumbicyclo [2.2.2] octane (DABMe$^+$).

4. A crystalline material according to claim 1 or 2 wherein R is the cation 1,4-bis[N-(4-aza,1-azoniumbicyclo[2,2,2] octane)methyl]benzene (d-DABBz)$^{2+}$.

5. A crystalline material according to claim 1 or 2, wherein X is one or more trivalent element selected from the group consisting of B, Al, In, Ga, Fe and Cr.

6. A crystalline material according to claim 2, wherein T is one or more tetravalent elements selected from the group consisting of V, Sn, Ti and mixtures thereof.

7. A crystalline material according to claim 2, whose composition expressed in molar ratios is the following:
ROH/(SiO$_2$+GeO$_2$+TO$_2$) is between 0.5 and 0.01,
GeO$_2$/(SiO$_2$+GeO$_2$+TO$_2$) is between 0.67 and 0.02,
(SiO$_2$+GeO$_2$+TO$_2$)/X$_2$O$_3$ is between ∞ and 50, and
TO$_2$/(SiO$_2$+GeO$_2$+TO$_2$) is between 0.15 and 0.

8. A crystalline material according to claim 2, whose composition expressed in molar ratios is the following:
R(OH)$_2$/(SiO$_2$+GeO$_2$+TO$_2$): between 0.25 and 0.005,
GeO2/(SiO$_2$+GeO$_2$+TO$_2$): between 0.67 and 0.02,
(SiO$_2$+GeO$_2$+TO$_2$)/X$_2$O$_3$: between ∞ and 50,
TO$_2$/(SiO$_2$+GeO$_2$+TO$_2$): between 0.15 and 0.

9. A crystalline material according to claim 2 wherein t varies between 0 and 0.10.

10. A crystalline material according to claim 2 wherein z is comprised between 0.04 and 0.5.

11. A crystalline material according to claim 2 wherein t varies between 0 and 0.10, and z is comprised between 0.04 and 0.5.

12. A crystalline material according to claim 1 wherein Y is one or more tetravalent elements selected among from the group consisting of Si, Sn, Ti V and mixtures thereof.

13. A crystalline material according to claim 1 wherein Y is Si.

14. A crystalline material according to claim 1 wherein x varies between 0 and 0.01.

15. A crystalline material according to claim 1 wherein z is comprised between 0.04 and 0.5.

16. A crystalline material according to claim 1 wherein r varies between 0.01 and 0.25.

17. A crystalline material according to claim 1 wherein x varies between 0 and 0.01, z is comprised between 0.04 and 0.5, and r varies between 0.01 and 0.25.

18. A process for synthesizing a crystalline material that does not contain fluorides, with a composition in a roasted state corresponding to that of the material called ITQ-17 and in that it has a composition on an anhydrous base and in terms of moles of oxides upon being synthesized, unroasted, represented by:

$$xX_2O_3 : (1-z)YO_2 : zGeO_2 : r/nR_nO$$

wherein:
X is at least one trivalent element,
Y is one or more tetravalent elements other than germanium,
R is an organic structure directing compound,
x varies between 0 and 0.02,
z is comprised between 0.02 and 0.67,
r varies between 0.01 and 0.5, and
n is 1 or 2,
and whose most representative values of the X-ray diffraction angle are the following:

| 2Θ ± 0.5 (degrees) | Intensity (I/Io) |
|---|---|
| 6.89 | w, m |
| 9.57 | vs |
| 19.35 | m |
| 21.37 | m |
| 21.90 | vs | vs: very strong,
m: medium,
w: weak, and whose process comprises:
a) preparing a synthesis mixture that comprises at least:
   a source of one or several tetravalent elements included under the name Y,
   a source of Ge,
   a source of at least one structure directing agent, and water;
b) keeping the synthesis mixture at temperatures between 100 and 200° C., until the crystalline material is formed, and
c) recovering the crystalline material.

19. A process according to claim 18, wherein the source of germanium and of the rest of the tetravalent elements is an oxide.

20. A process according to claim 18, wherein the synthesis mixture also comprises a source selected from the group consisting of:
   a source of one or more trivalent elements, X,
   a source of one or more tetravalent elements other than Si and Ge, and
   mixtures thereof.

21. A process according to claim 18, wherein the source of the structure directing agent, R, is 1-methyl-4-aza,1-azoniumbicyclo[2,2,2]octane hydroxide (DABMeOH), and wherein the synthesis mixture has a composition expressed in terms of molar ratios in the following intervals:
   $H_2O/(YO_2+GeO_2)$: between 100 and 0.01,
   $OH^-/(YO_2+GeO_2)$: between 3 and 0.01,
   $R/(YO_2+GeO_2)$: between 3 and 0.01,
   $GeO_2/(YO_2+GeO_2)$: between 0.67 and 0.02, and
   $(YO_2+GeO_2)/X_2O_3$: between ∞ and 50.

22. A process according to claim 18, wherein the source of the structure directing agent, R, is 1,4-bis[N-(4-aza,1-azoniumbicyclo[2,2,2]octane)methyl]benzene hydroxide (d-DABBz(OH)$_2$), and wherein the synthesis mixture has a composition expressed in terms of molar ratios in the following intervals:
   $H_2O/(YO_2+GeO_2)$: between 100 and 0.01, OH.sup.-
   $YO_2+GeO_2$): between 3 and 0.01, $R/YO_2+GeO_2$): between 1.5 and 0.005, $GeO_2/YO_2+GeO_2-$): between 0.657 and 0.02, $(YO_2+GeO_2)/X_2O_3$: between ∞ and 50.

23. A process for synthesizing a crystalline material that does not contain fluorides according to claim 18 wherein x varies between 0 and 0.01.

24. A process for synthesizing a crystalline material that does not contain fluorides according to claim 18 wherein z is comprised between 0.04 and 0.5.

25. A process for synthesizing a crystalline material that does not contain fluorides according to claim 18 wherein x varies between 0.01 and 0.25.

26. A process for synthesizing a crystalline material that does not contain fluorides according to claim 18 wherein x varies between 0 and 0.01, z is comprised between 0.04 and 0.5, and r varies between 0.01 and 0.25.

27. A process according to claim 18, for preparing a material whose composition may be represented by the formula:

$$xX_2O_3 : tTO_2 : (1-z-t)SiO_2 : zGeO_2 : r/nR_nO$$

wherein:
T is one or more tetravalent elements other than Ge or Si,
t varies between 0 and 0.15, preferably between 0 and 0.10,
z is comprised between 0.02 and 0.67, that comprises:
a) preparing a synthesis mixture that comprises at least: a source of silicon, a source of Ge, and a source of at least one structure directing agent (R) and water
b) keeping the synthesis mixture at temperatures between 100 and 200° C., until the crystalline material is formed, and
c) recovering the crystalline material.

28. A process according to claim 27, wherein the source of the structure directing agent (R) is 1-methyl-4-aza,1-azoniumbicyclo[2,2,2]octane hydroxide (DABMeOH), and wherein the synthesis mixture has a composition expressed in terms of molar ratios in the following intervals:
   $H_2O/(SiO_2GeO_2+TO_2)$: between 100 and 0.01, $OH^-/(SiO_2+GeO_2+TO_2)$: between 3 and 0.01,
   $R/(SiO_2+GeO_2TO_2)-$: between 3 and 0.01,
   $GeO2/(SiO_2+GeO_2+TO_2)$: between 0.67 and 0.02,
   $(SiO_2+GeO_2+TO_2)/X_2O_3$: between ∞ and 50, and
   $TO_2/(SiO_2+GeO_2+TO_2)$: between 0.15 and 0.

29. A process according to claim 27, wherein the structure directing agent, R, is 1,4-bis[N-(4-aza,1-azoniumbicyclo[2,2,2]octane)methyl]benzene hydroxide (d-DABBz (OH)$_2$), and wherein the synthesis mixture has a composition expressed in terms of molar ratios in the following intervals:
   $H_2O/(SiO_2+GeO_2+TO_2)$: between 100 and 0.01, $OH^-/(SiO_2+GeO_2+TO_2)$: between 3 and 0.01,
   $R/(SiO_2+GeO_2+TO_2)$: between 1.5 and 0.005,
   $GeO_2/(SiO_2+GeO_2+TO_2)$: between 0.67 and 0.02,
   $(SiO_2+GeO_2TO_2)/X_2O_3$: between ∞ 50,
   $TO_2/(SiO_2+GeO_2+TO_2)$: between 0.15 and 0.

30. A process according to claim 27, wherein the synthesis mixture comprises one or more tetravalent elements, T, selected from the group consisting of V, Sn, and Ti, and mixtures thereof.

31. A process according to claim 27, wherein the source of germanium, silicon and the rest of the tetravalent elements is an oxide.

32. A process according to claim 27, wherein the synthesis mixture also comprises a source of one or more trivalent elements, X.

33. A process according to claim 18 or 27 that also comprises a step of post-synthesis treatment of the material, whereby the organic component is removed from the structure by means of a technique selected from the group consisting of extraction, roasting and both.

34. A material obtained according to the process of claim 33, characterized in that its diffraction diagram has the following as the most important lines:

| 2Θ ± 0.5 (degrees) | Intensity (I/Io) |
|---|---|
| 6.89 | w, m |
| 9.59 | vs |
| 21.27 | m |
| 21.87 | m |
| 27.87 | vs. |

* * * * *